United States Patent [19]
Olcott

[11] 3,853,586
[45] Dec. 10, 1974

[54] TAPERED CARBON/PYROLYTIC GRAPHITE COMPOSITE MATERIAL

[75] Inventor: Eugene L. Olcott, Falls Church, Va.

[73] Assignee: Atlantic Research Corporation, Alexandria, Va.

[22] Filed: Oct. 4, 1968

[21] Appl. No.: 765,200

[52] U.S. Cl. ............ 117/37 R, 117/46 CG, 117/95, 239/265.11, 239/DIG. 19
[51] Int. Cl. ............................................ B64d 33/04
[58] Field of Search .................... 117/46, 228, 37 R; 239/265.11, DIG. 19

[56] References Cited
UNITED STATES PATENTS

| | | |
|---|---|---|
| 3,084,394 | 4/1963 | Bickerdike et al. ........ 117/46 CC X |
| 3,317,338 | 5/1967 | Batchelor ............................. 117/46 |
| 3,335,063 | 8/1967 | Goeddel et al. ............ 117/46 CG X |
| 3,647,511 | 3/1972 | Clark et al. .................... 117/46 CG |

Primary Examiner—Benjamin R. Padgett
Attorney, Agent, or Firm—Martha L. Ross

[57] ABSTRACT

Improved carbon/pyrolytic graphite composite materials are disclosed which are tapered from center to end. These tapered composites are useful as walls and wall liners for rocket nozzles, thrust chambers, etc.

6 Claims, 1 Drawing Figure

PATENTED DEC 10 1974 3,853,586

INVENTOR
EUGENE L. OLCOTT

BY David E. Brook

ATTORNEY

TAPERED CARBON/PYROLYTIC GRAPHITE COMPOSITE MATERIAL

The invention herein described was made in the course of or under a contract or subcontract thereunder with the United States Air Force.

BACKGROUND OF THE INVENTION

1. Field of the Invention

This invention relates to an improvement in carbon/pyrolytic graphite composite materials and more specifically to the improvement of tapering carbon/pyrolytic graphite materials towards their ends.

2. Description of the Prior Art

Carbon substrates coated with pyrolytic graphite have demonstrated excellent resistance to chemical erosion at solid rocket propellant flame temperatures. These composite materials have not been generally accepted, however, for use as rocket nozzle liners because of their tendency to crack, spall or delaminate during service. These defects are the result of residual stresses built up in the composite material during deposition of the pyrolytic graphite coating combined with the severe thermal stresses encountered during firing.

Residual stresses develop in the composite during coating because of the basic anisotrophy of both the carbon substrate and pyrolytic graphite coating. In general, the residual stresses will increase in magnitude with the thickness of the coating and/or the substrate.

One process for producing suitable pyrolytic graphite coatings on the interior walls of graphite rocket nozzles has been patented by Batchelor, J. D. in U.S. Pat. No. 3,317,338, issued May 2, 1967. The Batchelor process does not, however, produce a composite free from residual stresses. See Col. 1, lines 54–61 and Col. 8, lines 41–42, U.S. Pat. 3,317,338.

SUMMARY OF THE INVENTION

Applicant has now discovered that carbon/pyrolytic graphite composite materials can be improved by tapering the composites from their center portion towards their ends.

Tapering carbon/pyrolytic graphite composite materials towards their ends takes advantage of applicant's finding that the residual stresses are greater at the ends than at or near the center of these composite materials. Since the coating and/or substrate will be thinner at the ends in applicant's composites, the residual stresses will be reduced at the point where they are the greatest. Additionally, the center portion of the composite, where it is thicker, can be used at the throat of a rocket nozzle, where the greatest chemical and mechanical erosion takes place. Concomitantly, the ends of the carbon/pyrolytic graphite composite material, where the coating and/or substrate is thinner, can be used at the entrance and exits of a rocket nozzle where erosion during service is lesser.

Another important advantage is that thicker flawless pyrolytic graphite coatings can be deposited at the throat of a rocket nozzle or nozzle insert if the coating is tapered than can be deposited if the coating is untapered.

DRAWINGS

DESCRIPTION OF THE INVENTION

Figure 1:
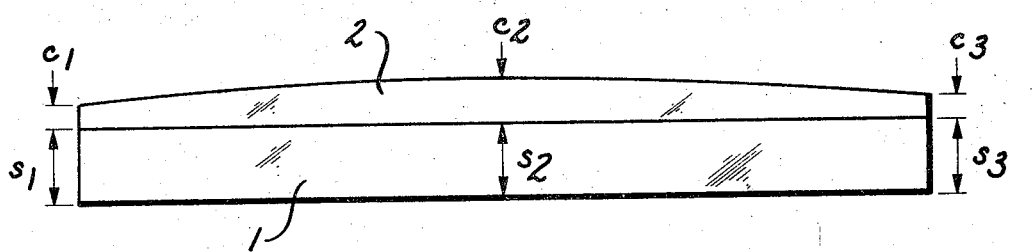
FIG. 1 is a side view of a carbon substrate with a tapered pyrolytic graphite coating.

The composite materials of this invention are formed from carbon substrates coated with pyrolytic graphite. Either the coating or the substrate, or both, is tapered from the center portion of the composite towards the ends.

To more clearly indicate what is meant by terms subsequently used, these terms are defined for purposes of this invention as follows.

The terms "graphite", "commercial graphite" and "pyrolytic graphite" have their commonly accepted meanings to the art which are well defined at Col. 2, line 43 through Col. 3, line 33 of Batchelor, U.S. Pat. No. 3,317,338, which definitions are herein incorporated by reference.

The term "carbon substrate" is used to mean any bonded or compacted form of carbonaceous material containing at least 90% carbon. For convenience, such materials are referred to simply as carbon substrates.

It is preferred to use carbonaceous materials which have previously been subjected to graphitizing temperatures as substrates, since these materials are more thermally stable than other forms of carbonaceous material at pyrolytic graphite deposition temperatures.

Most commercial graphites can be used to form carbon substrates for the composite material of this invention. Additionally, Commercially available fibrous carbonaceous materials and carbon impregnated materials can be used. Some specific examples of commercially available carbonaceous materials suitable for use as carbon substrates are given in the following table:

| Source | Grade | Description | Density (g/cc) |
|---|---|---|---|
| Commercial Graphites | | | |
| U.C.C. | AGSR | Coarse grain, extruded, low CTE | 1.6 |
| U.C.C. | ATJ | Fine grain, molded | 1.7 |
| Speer | 580 | Fine grain, extruded | 1.7 |
| Speer | 9634 | Coarse grain, extruded, low CTE | 1.7 |
| Fibrous Carbonaceous Material | | | |
| U.C.C. | PTA | Axial-pressed, random fiber | 1.2 |
| U.C.C. | PT-0237 | Axial-pressed, random fiber | 1.0 |
| U.C.C. | PT | Radial-pressed, random fiber | 1.2 |
| U.C.C. | PT | Radial-pressed, random fiber | 1.0 |
| Carborundum | 700 | Laminate | 1.4 |
| Carborundum | Carbitex | Uniaxial flow | 1.4 |
| Carbon Impregnated Material | | | |
| Super-Temp | RPG | Pyrolytic graphite impregnated felt | 0.85–0.93 |

Abbreviations:
U.C.C. = Union Carbide Corp., Carbon Products Div.
Speer = Speer Carbon Co., a division of Airco
Carborundum = Carborundum Co., Carbon Products Div.
Super-Temp = Super-Temp, Inc.
CTE = coefficient of thermal expansion Coarse grain, extruded, low CTE graphite is a particularly preferred carbon substrate material because of its low coefficient of thermal expansion, low modulus of elasticity, and because it is inexpensive relative to some of the other commercial graphites.

To obtain the best composites, it is important to match the substrate material to the pyrolytic graphite coating. In general, it is desirable to select a substrate material which: (1) has a thermal coefficient of expansion close to that of pyrolytic graphite; (2) has a low modulus of elasticity; (3) has high tensile strength; and (4) has a grain orientation similar to or the same as that of pyrolytic graphite. Since it is unlikely that one carbon substrate will rank best in all of these, some balancing of properties has to be made in substrate selection. Also, since both the substrate and coating are anisotrophic, it is usually impossible to match properties such as thermal coefficient of expansion and modulus of elasticity in both the in-plane (a-b) and crossplane (c) directions; in such instances, it is believed to be more desirable to match properties in the in-plane direction.

Pyrolytic graphite can be deposited on the carbon substrates by passing a mixture of a lower aliphatic hydrocarbon gas and an inert gas such as nitrogen or argon over the substrate which has been heated to extremely high temperatures, usually in the range of about 1900°C. -2400°C. Methane, ethane, propane, butane, ethylene and acetylene are examples of suitable lower aliphatic hydrocarbon gases.

Pyrolytic graphite deposition is usually accomplished in high temperature furnaces especially equipped for this purpose. One suitable furnace is the resistance heated tube furnace, Model C412, manufactured by Pereny Equipment Co. This furnace has a resistance heating tube inside diameter of four inches, a heated length of four feet, and can maintain controlled temperatures from 1300°C. to 3000°C. using a magnetic amplifier –saturable reactor control system. An inner tube of graphite is inserted within the resistance heating tube before the furnace is used. The sensing element is a radiometer focused on the outer surface of the inner tube through a hole in the heating tube by a sight tube at the center of the furnace. The temperature within a region of about 12 inches in the center of the inner tube is essentially uniform. Therefore, carbon substrates to be coated with pyrolytic graphite are placed in this center region of the furnace.

A more detailed description of the process variables in forming carbon/pyrolytic graphite composite materials is presented in Batchelor, U.S. Pat. No. 3,317,338, issued May 2, 1967, which description is hereby expressly incorporated by reference.

Figure 2:
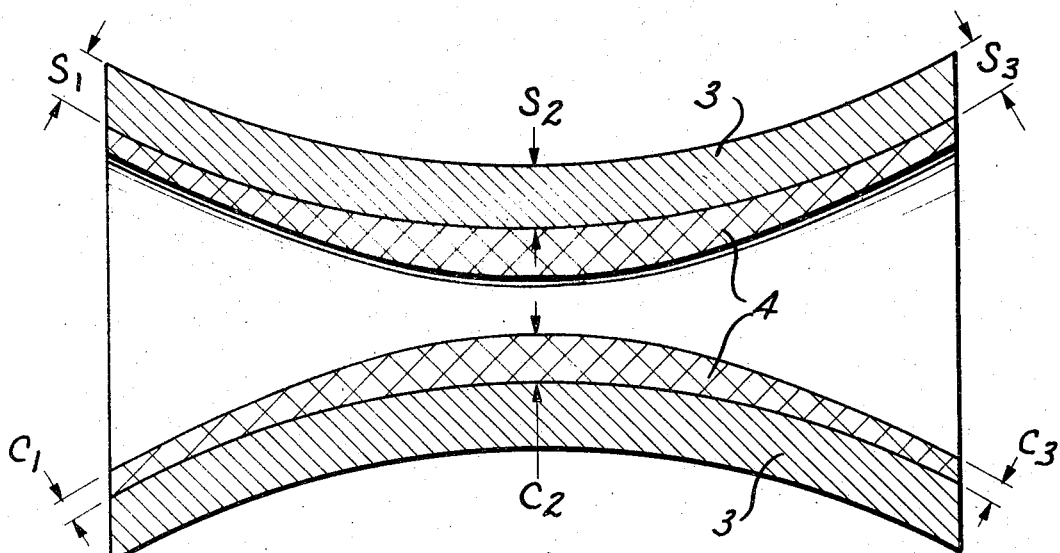
FIG. 2 is a cut-away plan view of a rocket nozzle constructed from the tapered carbon/pyrolytic graphite composite material of this invention.

As has previously been stated, the carbon/pyrolytic graphite composite materials of this invention are tapered from their center portion to their ends. Tapering can be the result of a tapered coating, a tapered substrate, or both. FIG. 1 illustrates a flat untapered carbon substrate 1 coated with pyrolytic graphite 2, which coating tapers from its center to its opposite ends. In this case, the coating thickness at the center $c_2$ is larger than that at either end, $c_1$ or $c_3$. FIG. 2 illustrates the use of composite material as a wall liner in a rocket nozzle, wherein the coating thickness at the throat of the nozzle $C_2$ is greater than the thickness of the coating at both the entrance to the nozzle, $C_1$, and the exit from the nozzle, $C_3$.

The substrates can be tapered so that $s_2$ is greater than either $s_1$ or $s_3$ and $S_2$ is greater than either $S_1$ or $S_3$. Such tapered substrates can then be coated with an untapered pyrolytic graphite coating ($c_1 = c_2 = c_3$; $C_1 = $_2 = C_3$), or a tapered pyrolytic graphite coating ($c_2 > $ either $c_1$ or $c_3$; $C_2 > $ either $C_1$ or $C_3$).

The amount of taper desired will depend upon the intended application for the composite material. Where a composite is tapered towards opposite ends, the degree of taper does not have to be equal on both sides of the center. In general, the amount of taper desired will be a function of the erosion profile of the composite in a particular application. For service as rocket nozzle walls or liners, the erosion profile is determined by nozzle geometry and motor conditions. As illustrative of the amount of taper used, it has been found suitable to taper composites from about 10 mils to about 40 mils from throat to entrance and from throat to exit in rocket nozzle inserts having inside diameters of about 1.1 inches and 2.2 inches.

The length of coating on the inside surface of a rocket nozzle will also vary with service conditions. It has been found satisfactory, however, to coat out to an area ratio (area at entrance or exit/area at throat) of about 1.3 to about 2.5.

Tapering the carbon substrate can be accomplished by ordinary and well-known machining operations.

Pyrolytic graphite coatings can be obtained by adjusting appropriate variables of the coating process. These variables include: injector position and geometry; substrate position and geometry; and gas velocity. The most practical method of adjusting the amount of taper is to adjust the gas injector position. Although a trial and error procedure is used to find the proper injector position the first time a particular taper is desired, once the proper position is found, the same taper can be reproduced subsequently by positioning the injector at the identical location.

Because of its excellent chemical and mechanical erosion resistance at elevated temperatures and pressures, carbon/pyrolytic graphite composite material is useful as walls or liners for rocket nozzles, thrust chambers, combustion chambers, afterburners and the like. In such applications, the composite material also has excellent insulative properties because of the low thermal conductivity, this allows a reduction in the amount of backside insulation ordinarily required for such applications which in turn results in considerable weight savings.

The invention is further illustrated by the following example.

EXAMPLE

Carbon/pyrolytic graphite composite material was prepared in the form of ring inserts for rocket nozzles from a variety of substrate materials and with a variety of coating thicknesses in a Pereny graphite resistance heating unit, Model C412. Mixtures of methane and nitrogen, approximately 5CH$_4$–95%N$_2$, were used as a source of pyrolytic graphite. The furnace was operated at approximately atmospheric pressure and at a temperature of about 2150°C. Tapering was accomplished in each case by adjusting the gas injector to a proper position.

Each insert was mounted in a nozzle housing using a graphite support member and insulating member. A pyrolytic graphite plate was placed at the insert entrance to minimize erosion of the coating edge.

Each nozzle was attached to a gel test motor for firing. Propellant depth was selected to sustain firing for a predetermined duration. Propellants having flame temperatures in the range of 4710°F. to 6550°F. were used in the firings.

Each nozzle insert was examined under a 60x metallurgical microscope before and after firing. It was found that the untapered composites developed severe cracks and delaminations during firing while the tapered composites were flaw-free or only had developed marginal cracks. This demonstrates that the tapered composites contained lesser residual stresses than the untapered composites.

What is claimed is:

1. In a composite material of reduced residual stress an annular carbon substrate having an inner surface and a pyrolytic graphite coating vapor deposited onto said inner surface of said substrate, said composite carbon/pyrolytic graphite material having a center portion and two end portions arranged along a longitudinal axis, the improvement wherein the center portion of said composite material has a thickness normal to its inner surface which is greater than the thickness at at least one of said end portions, resulting in a taper from its center portion towards said at least one end.

2. The improvement of claim 1 wherein said carbon substrate comprises graphite.

3. The improvement of claim 2 wherein said graphite substrate is of substantially uniform thickness and said pyrolytic graphite coating is tapered from its center portion towards said at least one end of said composite material.

4. The improvement of claim 3 wherein said pyrolytic graphite coating is tapered from its center portion towards both ends of said composite graphite material.

5. The improvement of claim 1 wherein said pyrolytic graphite coating is of substantially uniform thickness and said carbon substrate is tapered from its center portion towards at least one end of said composite graphite material.

6. The improvement of claim 2 wherein said pyrolytic graphite coating is of substantially uniform thickness and said graphite substrate is tapered from its center portion towards at least one end of said composite graphite material.

* * * * *